US010492976B2

(12) United States Patent
Zhang et al.

(10) Patent No.: US 10,492,976 B2
(45) Date of Patent: Dec. 3, 2019

(54) POWERED EXOSKELETON (71) Applicant: BOE TECHNOLOGY GROUP CO., LTD., Beijing (CN)

(72) Inventors: Ying Zhang, Beijing (CN); Zhongcheng Gui, Beijing (CN); Yifei Zhang, Beijing (CN); Kai Zhao, Beijing (CN); Yu Gu, Beijing (CN); Hongli Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 185 days.

(21) Appl. No.: 15/531,544

(22) PCT Filed: Aug. 31, 2016

(86) PCT No.: PCT/CN2016/097597
§ 371 (c)(1),
(2) Date: May 30, 2017

(87) PCT Pub. No.: WO2017/118059
PCT Pub. Date: Jul. 13, 2017

(65) Prior Publication Data
US 2018/0042804 A1 Feb. 15, 2018

(30) Foreign Application Priority Data
Jan. 5, 2016 (CN) .......................... 2016 1 0006157

(51) Int. Cl.
A61H 3/00 (2006.01)
A63C 17/12 (2006.01)
(Continued)

(52) U.S. Cl.
CPC ............... A61H 3/00 (2013.01); A63C 17/04 (2013.01); A63C 17/12 (2013.01);
(Continued)

(58) Field of Classification Search
CPC ...... A61H 3/00; A61H 2201/00; A63C 17/12; A63C 17/008; G05B 2219/40305; B25J 9/0006; A61F 2/60; A61F 5/01
See application file for complete search history.

(56) References Cited

U.S. PATENT DOCUMENTS

2003/0062697 A1* 4/2003 Chu ..................... A63C 17/008
280/11.221
2005/0029756 A1* 2/2005 Lin ..................... A63C 17/008
280/11.27
(Continued)

FOREIGN PATENT DOCUMENTS

CN 101234247 A 8/2008
CN 104856842 A 8/2015
(Continued)

OTHER PUBLICATIONS

English translation of CN 104856842A (Year: 2015).*
(Continued)

Primary Examiner — Brian E Pellegrino
Assistant Examiner — Rebecca Lynee Zimmerman
(74) Attorney, Agent, or Firm — Dilworth & Barrese, LLP.; Michael J. Musella, Esq (57) ABSTRACT A powered exoskeleton includes a leg part and a foot part. The foot part includes a foot bottom plate and a foot bottom plate driving wheel. The foot bottom plate includes a first surface and a second surface opposite to each other; and the foot bottom plate driving wheel is connected below the leg part. The foot bottom plate is movably connected to the foot bottom plate driving wheel and capable of being turned over relative to the foot bottom plate driving wheel. In the walking mode, the foot bottom plate is turned over till the first surface of the foot bottom plate faces upward and is connected below the foot bottom plate driving wheel; and in the wheeled movement mode, the foot bottom plate is turned (Continued)

over till a second surface of the foot bottom plate faces upward and is connected above the foot bottom plate driving wheel.

18 Claims, 6 Drawing Sheets

(51) Int. Cl.
    *A63C 17/04*     (2006.01)
    *A61H 3/04*     (2006.01)
    *B25J 9/00*     (2006.01)

(52) U.S. Cl.
    CPC .... *A61H 2003/043* (2013.01); *A63C 2203/50* (2013.01); *B25J 9/0006* (2013.01)

(56) References Cited

U.S. PATENT DOCUMENTS

2009/0292369 A1* 11/2009 Kazerooni ............... A61H 3/00
                                                  623/27

2014/0196757 A1* 7/2014 Goffer ..................... A61H 3/02
                                                  135/66
2015/0025423 A1* 1/2015 Caires .................... A61H 1/024
                                                  601/35

FOREIGN PATENT DOCUMENTS

| | | |
|---|---|---|
| CN | 204582512 U | 8/2015 |
| CN | 105662787 A | 6/2016 |
| CN | 205286622 U | 6/2016 |
| TW | 201330843 A1 | 8/2013 |
| WO | 2015080596 A1 | 6/2015 |

OTHER PUBLICATIONS

International Search Report dated Oct. 28, 2016.
First Chinese office Action dated Dec. 1, 2016.
Second Chinese Office Action dated Apr. 24, 2017.

* cited by examiner

POWERED EXOSKELETON

TECHNICAL FIELD

Embodiments of the present disclosure relate to a powered exoskeleton.

BACKGROUND

A powered exoskeleton is a skeleton frame worn outside a human body, is driven by a series of motor systems or hydraulic pneumatic systems, and is used for expanding or enhancing physiological functions of a human body (mainly motion capabilities of limbs, such as strength and endurance). The powered exoskeletons are applied in two major aspects; first, for military use, the exoskeleton is worn by a soldier, such that the soldier can carry heavier weaponry and can walk with a load for a long time and thus the combat capability of the soldier is improved; second, for civil use, the exoskeleton is used by the disabled or the elder particularly, and helps them to own a normal or even extraordinary athletic ability, especially an ability to walk.

The powered exoskeleton, as a walking assisting device, plays an important role in improvement of a living quality of the disabled or the elder, but a powered exoskeleton which effectively combines the exoskeleton with wheeled movement is absent, and it is still unavailable to realize fast movement.

SUMMARY

Embodiments of the present disclosure provide a powered exoskeleton which can realize a wheeled movement, and thus can realize a fast movement.

An embodiment of the present disclosure provides a powered exoskeleton, which comprises: a leg part for being fixed on legs of a human body and capable of driving the legs of the human body to move; and a foot part for being fixed on feet of the human body and capable of driving the feet of the human body to move. The foot part comprises: a foot bottom plate, comprising a first surface and a second surface opposite to each other; and a foot bottom plate driving wheel, connected below the leg part. The foot bottom plate is movably connected to the foot bottom plate driving wheel and capable of being turned over relative to the foot bottom plate driving wheel, such that the foot part has a first state and a second state. In the first state, the first surface of the foot bottom plate faces upward and is connected below the foot bottom plate driving wheel, such that the foot part is in a walking mode; and in the second state, the second surface of the foot bottom plate faces upward and is connected above the foot bottom plate driving wheel, such that the foot part is in a wheeled movement mode.

For example, in the powered exoskeleton according to an embodiment of the present disclosure, the foot bottom plate is movably detachably connected to the foot bottom plate driving wheel.

For example, in the powered exoskeleton according to an embodiment of the present disclosure, the foot part further comprises: a first locking mechanism, configured to lock or detach the foot bottom plate driving wheel and the foot bottom plate, such that the foot bottom plate is connected below the foot bottom plate driving wheel in the first state; and a second locking mechanism, configured to lock or detach the foot bottom plate driving wheel and the foot bottom plate, such that the foot bottom plate is connected above the foot bottom plate driving wheel in the second state.

For example, in the powered exoskeleton according to an embodiment of the present disclosure, the first locking mechanism comprises a first locking part, disposed on the foot bottom plate driving wheel; a rotary connecting rod, comprising a first end and a second end, the first end being rotatably connected to the foot bottom plate; and a second locking part, disposed on the second end of the rotary connecting rod and capable of being matched with the first locking part to lock or detach the foot bottom plate driving wheel with the foot bottom plate; in the first state, the second end of the rotary connecting rod rotates to a first position located above the first surface of the foot bottom plate, and the second locking part is matched with the first locking part to be locked; in the second state, the second locking part is detached from the first locking part, and the second end of the rotary connecting rod rotates to a second position flush with the foot bottom plate.

For example, in the powered exoskeleton according to an embodiment of the present disclosure, the first locking part comprises: a groove disposed in the foot bottom plate driving wheel; and a fixing pillar disposed in the groove. The second locking part comprises: an inner ring which is capable of being sleeved outside the fixing pillar; an outer ring which is capable of being accommodated in the groove, the outer ring being sleeved outside the inner ring, a gap being formed between the outer ring and the inner ring; a rotatable locking pillar disposed in the gap, a width of the gap being changed when the locking pillar rotates to different angles; and a control handle controlling the locking pillar to rotate, the control handle being connected to the locking pillar. When the locking pillar rotates to a first angle, the gap has a first width, the locking pillar abuts the inner ring against the fixing pillar, and the outer ring abuts against the inner wall of the groove; when the locking pillar rotates to a second angle, the gap has a second width, the second width is smaller than the first width, the inner ring is separated from the fixing pillar, and the outer ring is separated from the inner wall of the groove.

For example, in the powered exoskeleton according to an embodiment of the present disclosure, the foot part further comprises a rotary connecting rod fixing structure for fixing the second end of the rotary connecting rod to the second position in the second state.

For example, in the powered exoskeleton according to an embodiment of the present disclosure, the second locking mechanism comprises: a locking fixing shaft, disposed above the foot bottom plate driving wheel; and a locking sleeve, which is disposed on the foot bottom plate and capable of being locked with or detached from the locking fixing shaft when the second surface of the foot bottom plate faces upward.

For example, in the powered exoskeleton according to an embodiment of the present disclosure, the locking sleeve comprises: a sleeve structure which is capable of being sleeved on the locking fixing shaft, an elastic bayonet is provided on a side of the sleeve structure, and an opening size of the elastic bayonet is smaller than an inner diameter size of the sleeve.

For example, in the powered exoskeleton according to an embodiment of the present disclosure, the foot bottom plate driving wheel comprises a driving motor, the driving motor comprises a fixing shaft, a motor rotor disposed on the fixing shaft and a wheel body disposed outside the motor rotor and capable of rotating when driven by the motor rotor.

For example, in the powered exoskeleton according to an embodiment of the present disclosure, the wheel body is a rubber wheel.

For example, in the powered exoskeleton according to an embodiment of the present disclosure, two ends of the fixing shaft of the foot bottom plate driving wheel are connected to two first connecting rods respectively, a connecting shaft is connected between the two first connecting rods, a connecting part is disposed below the leg part, and the connecting part is matched with the connecting shaft to detachably connect the foot bottom plate driving wheel below the leg part.

For example, in the powered exoskeleton according to an embodiment of the present disclosure, the foot part further comprises a foot bottom plate supporting wheel, the foot bottom plate supporting wheel is disposed on the first surface of the foot bottom plate and is configured for being matched with the foot bottom plate driving wheel.

For example, in the powered exoskeleton according to an embodiment of the present disclosure, the leg part comprises: a thigh connecting part for fixing and supporting a thigh of the human body; a shank connecting part for fixing and supporting a shank of the human body; and a knee joint driving part connected between the thigh connecting part and the shank connecting part.

For example, in the powered exoskeleton according to an embodiment of the present disclosure, the thigh connecting part and/or the shank connecting part comprises a length-adjustable structure.

The powered exoskeleton according to embodiments of the present disclosure can be switched between the walking mode and the wheeled movement mode, and can be used for assisting walking, and can also serve as a means of transport for fast wheeled movement. Due to such structural design, the powered exoskeleton can help the disabled or the elder to perform recovery exercise, and can realize fast movement at proper time. The powered exoskeleton is simple in structure and can be fast switched.

DETAILED DESCRIPTION

In order to clarify the objects, technical solutions and advantages of the present disclosure, the technical solutions of embodiments of the present disclosure will be described in a clearly and fully understandable way in connection with the drawings of embodiments of the present disclosure. It is obvious that the described embodiments are just a part but not all of embodiments of the disclosure. Based on the described embodiments of the present disclosure herein, those ordinary skilled in the art can obtain all other embodiment(s) which should be within the scope of the disclosure.

Unless otherwise defined, the technical or scientific terms used in the present application should be the general meaning understood by those having ordinal skills in the art. The terms "first", "second" and similar words used in the specification and claims of the patent application of the present disclosure do not represent any order, quantity or importance, and are merely intended to differentiate different constituting parts. Similarly, "a" or "an" and other similar words do not represent quantity limitation, and represent that at least one exists. "Connected" or "connection" and other similar words are not limited to physical or mechanical connection, but can comprise electric connection regardless of direct or indirect connection. "Upper", "lower", "left" and "right" are merely intended to represent a relative position relation, and the relation position relation is correspondingly changed when an absolute position of a described object is changed.

An embodiment of the present disclosure provides a powered exoskeleton which can realize a wheeled movement, and thus can realize a fast movement.

For example, as illustrated in FIGS. 1 to 6, the powered exoskeleton provided by an embodiment of the present disclosure comprises leg parts for being connected to legs of a human body and capable of driving the legs of the human body to move; and foot parts for being fixed on feet of the human body and capable of driving the feet of the human body to move. The foot part includes a foot bottom plate 100 and a foot bottom plate driving wheel 200. The foot bottom plate 100 includes a first surface 101 and a second surface 102 opposite to each other; and the foot bottom plate driving wheel 200 is connected below the leg part.

For example, the foot bottom plate 100 is movably connected to the foot bottom plate driving wheel 200 and capable of being turned over relative to the foot bottom plate driving wheel 200, and thus has a first state and a second state. In the first state, the foot bottom plate 100 is turned over till the first surface 101 of the foot bottom plate faces upward and is connected below the foot bottom plate driving wheel 200, such that the foot part (or the powered exoskeleton) is in a walking mode; and in the second state, the foot bottom plate 100 is turned over till a second surface 102 of the foot bottom plate faces upward and is connected above the foot bottom plate driving wheel 200, such that the foot part (or the powered exoskeleton) is in a wheeled movement mode.

For example, the "below" described in an embodiment of the present disclosure means a direction close to the ground when the powered exoskeleton is in a normal working state, and the "above" means a direction away from the ground when the powered exoskeleton is in the normal working state.

For example, the powered exoskeleton provided by an embodiment of the present disclosure can be switched between the walking mode and the wheeled movement mode, and can be used for assisting walking, and can also serve as a means of transport for fast wheeled movement. To switch the powered exoskeleton to the wheeled movement mode, the foot bottom plate 100 of the powered exoskeleton can be turned over till the first surface 101 faces upward, such that the foot bottom plate 100 is connected above the foot bottom plate driving wheel 200, and the wheeled movement mode is realized by driven of the foot bottom plate driving wheel 200; and to switch the powered exoskeleton to the walking mode, the foot bottom plate 100 of the powered exoskeleton can be turned over till its second surface 102 faces upward, such that the foot bottom plate 100 is connected below the foot bottom plate driving wheel 200, and the walking mode is realized.

For example, due to such structural design, the powered exoskeleton can help the disabled or the elder to perform recovery exercise, and can realize fast movement at proper time. The powered exoskeleton is simple in structure and can be fast switched.

In an embodiment of the present disclosure, for example, the foot bottom plate 100 is movably detachably connected to the foot bottom plate driving wheel 200.

For example, the foot part further includes: a first locking mechanism and a second locking mechanism. The first locking mechanism is configured to lock or detach the foot bottom plate driving wheel 200 with the foot bottom plate 100, such that the foot bottom plate 100 is connected below the foot bottom plate driving wheel 200 in the first state. The second locking mechanism is configured to lock or detach the foot bottom plate driving wheel 200 with the foot bottom plate 100, such that the foot bottom plate 100 is connected above the foot bottom plate driving wheel 200 in the second state.

For example, by adopting the above solution, the foot bottom plate 100 is movably connected to the foot bottom plate driving wheel 200 in a detachable manner; to switch the powered exoskeleton to the walking mode, the foot bottom plate 100 can be detached from the foot bottom plate driving wheel 200, and the first locking mechanism is used to fix the foot bottom plate 100 below the foot bottom plate driving wheel 200; to switch the powered exoskeleton to the wheeled movement mode, the foot bottom plate 100 can be detached from the foot bottom plate driving wheel 200, and the second locking mechanism is used to fix the foot bottom plate 100 above the foot bottom plate driving wheel 200.

It should be noted that in another embodiment of the present disclosure, movable connecting between the foot bottom plate 100 and the foot bottom plate driving wheel 200 can be realized by adopting other manners, as long as the foot bottom plate 100 can be turned over to realize the first state and the second state.

In an embodiment of the present disclosure, as illustrated in FIGS. 1 to 6, for example, the first locking mechanism includes a first locking part 301, a rotary connecting rod 302 and a second locking part 303. The first locking part 301 is disposed on the foot bottom plate driving wheel 200. The rotary connecting rod 302 includes a first end and a second end, and the first end is rotatably connected to the foot bottom plate 100. The second locking part 303 is disposed on the second end of the rotary connecting rod 302 and capable of being matched with the first locking part 301 to be locked or detached.

For example, in the first state, the second end of the rotary connecting rod 302 rotates to a first position located above the first surface 101 of the foot bottom plate 100, and the second locking part 303 is matched with the first locking part 301 to be locked. For example, in the second state, the second locking part 303 is detached from the first locking part 301, and the second end of the rotary connecting rod 302 rotates to a second position flush with the foot bottom plate 100.

For example, by adopting the above solution, when it is required to switch to the walking mode, the second end of the rotary connecting rod 302 on the foot bottom plate 100 can be rotated to be above the first surface 101 of the foot bottom plate 100, and the second locking part 303 on the second end of the rotary connecting rod 302 and the first locking part 301 on the foot bottom plate driving wheel 200 are matched for fastening, so that the foot bottom plate 100 is fixed above the foot bottom plate driving wheel 200.

For example, when it is required to switch to the wheeled movement mode, the second end of the rotary connecting rod 302 rotates to a second position flush with the foot bottom plate 100, and the second locking part 303 on the second end of the rotary connecting rod 302 and the first locking part 301 on the foot bottom plate driving wheel are matched for detaching, so that the foot bottom plate 100 is detached from the foot bottom plate driving wheel 200.

It should be noted that in another embodiment of the present disclosure, there can be many kinds of specific structures of the first locking mechanism, which are not described one by one herein.

Figure 4:
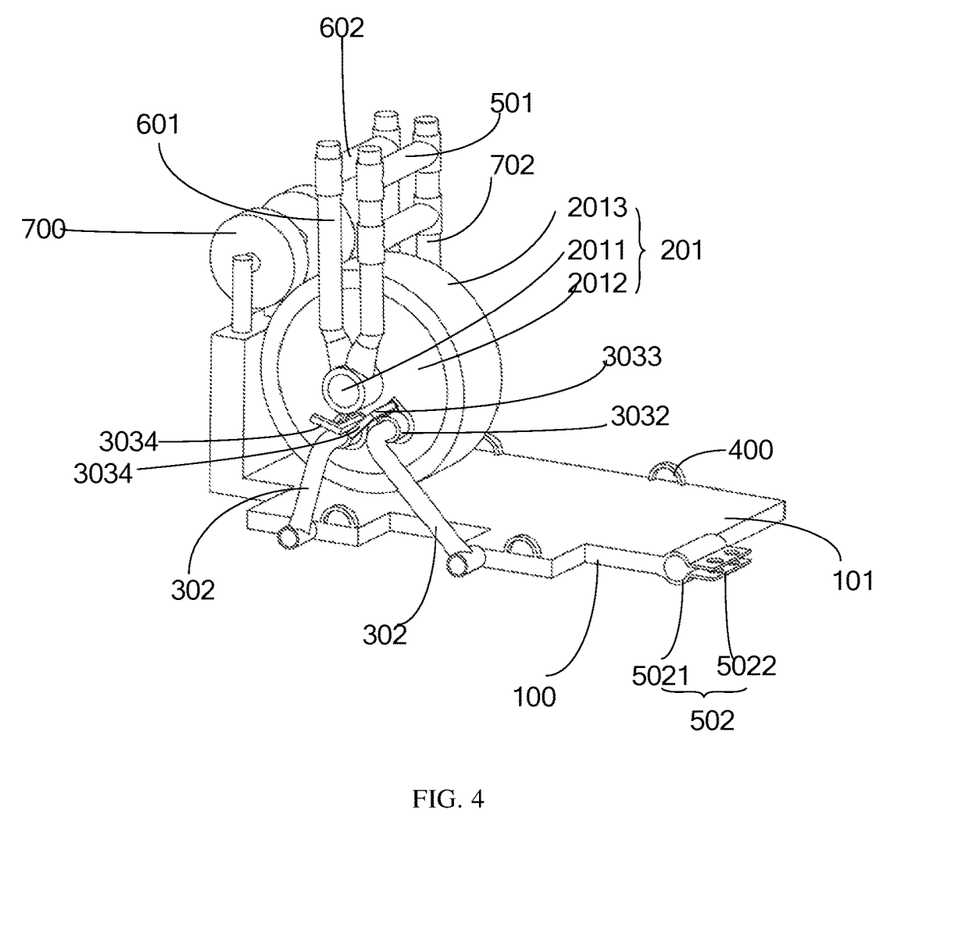
FIG. 4 is a structural schematic diagram of a foot part of the powered exoskeleton in the walking mode provided by an embodiment of the present disclosure.
Figure 5:
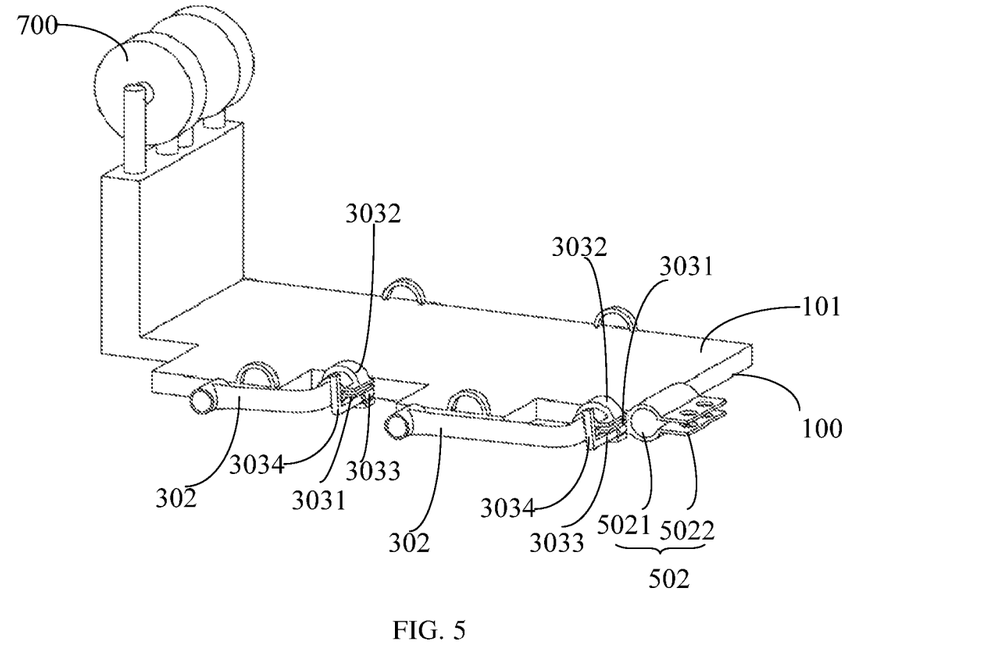
FIG. 5 is a structural schematic diagram of a foot bottom plate of the powered exoskeleton provided by an embodiment of the present disclosure.
Figure 6:
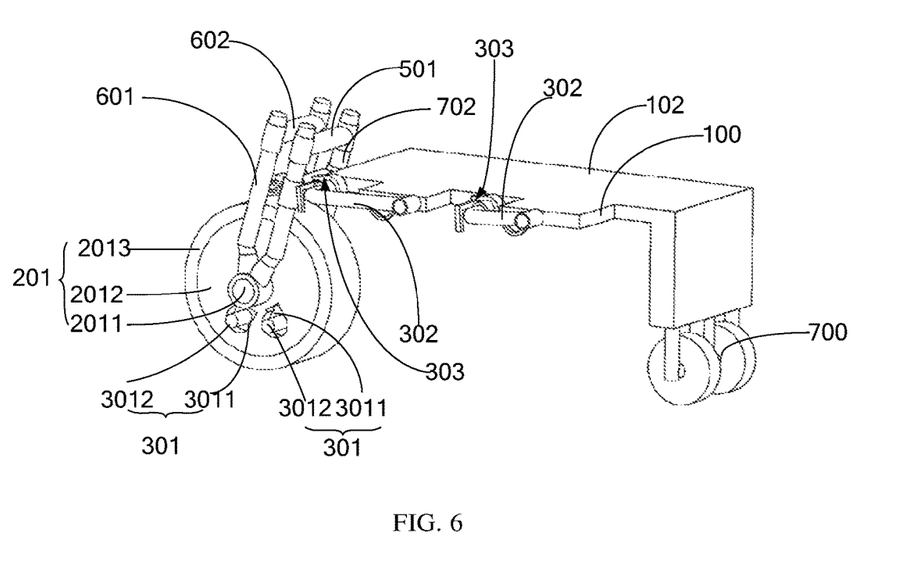
FIG. 6 is a structural schematic diagram of the foot part of the powered exoskeleton in a wheeled movement mode provided by an embodiment of the present disclosure.

In an embodiment of the present disclosure, for example, as illustrated in FIGS. 4 to 6, the first locking part 301 includes a groove 3011 disposed in the foot bottom plate driving wheel 200 and a fixing pillar 3012 disposed in the groove 3011. The second locking part 303 includes an inner ring 3031, an outer ring 3032, a locking pillar 3033 and a control handle 3034. The inner ring 3031 is capable of being sleeved outside the fixing pillar 3012. The outer ring 3032 is capable of being accommodated in the groove 3011. The outer ring 3032 is sleeved outside the inner ring 3031, with a gap being formed between the outer ring 3032 and the inner ring 3031. The locking pillar 3033 is disposed in the gap and can rotate, and the width of the gap is changed when the locking pillar 3033 rotates to different angles. The control handle 3034 is used for controlling the locking pillar 3033 to rotate, and the control handle 3034 is connected to the locking pillar 3033.

For example, when the locking pillar 3033 rotates to a first angle, the gap has a first width, the locking pillar 3033 abuts the inner ring 3031 against the fixing pillar 3012, and the outer ring 3032 is abutted against the inner wall of the groove 3011. When the locking pillar 3033 rotates to a second angle, the gap has a second width, the second width is smaller than the first width, the inner ring 3031 is separated from the fixing pillar 3012, and the outer ring 3032 is separated from the inner wall of the groove 3011.

For example, by adopting the above solution, the first locking part 301 adopts the structure of the inner ring 3031, the outer ring 3032 and the locking pillar 3033, the second locking part 303 adopts the structure of the groove 3011 and the fixing pillar 3012; when the first locking part 301 and the second locking part 303 need to be locked, the rotary connecting rod 302 is rotated, such that the inner ring 3031 and the outer ring 3032 of the first locking part 301 are sleeved on the fixing pillar 3012 in the groove 3011 on the foot bottom plate driving wheel 200; the control handle 3034 is rotated, such that the locking pillar 3033 located between the inner ring 3031 and the outer ring 3032 is rotated; due to the rotating of the locking pillar 3033, the inner ring 3031 and the outer ring 3032 are deformed; the width of the gap between the inner ring 3031 and the outer ring 3032 is increased; the inner ring 3031 is attached to the fixing pillar 3012; the outer ring 3032 is attached to the inner wall of the groove 3011; and locking is realized by means of a friction force between the inner ring 3031 and the fixing pillar 3012 and a friction force between the outer ring 3032 and the inner wall of the groove 3011.

For example, when the first locking part 301 and the second locking part need to be detached, the control handle 3034 is rotated in an opposite direction, such that the locking pillar 3033 between the inner ring 3031 and the outer ring 3032 is rotated in the opposite direction; due to the rotating of the locking pillar 3033, the inner ring 3031 and the outer ring 3032 are deformed; the width of a gap between the inner ring 3031 and the outer ring 3032 is reduced; the inner ring 3031 is separated from the fixing pillar 3012; and the outer ring 3032 is separated from the inner wall of the groove 3011, such that the first locking part 301 is detached from the second locking part 303.

It should be noted that in another embodiment of the present disclosure, structures of the first locking part 301 and the second locking structure 303 are not limited herein, the locking and detaching can be realized by adopting other manners. For example, the first locking part 301 and the second locking part 303 can also be locked or detached by adopting a nut threaded connecting manner, which is not described one by one herein.

It should also be noted that in the above solution, the locking pillar 3033 can be realized by adopting a pillar structure with an oval or rectangular section, or other structures can also be adopted as long as the width of the gap between the inner ring 3031 and the outer ring 3032 can be changed to realize locking and detaching when the locking pillar 3033 is rotated to different angles.

In an embodiment of the present disclosure, for example, the foot part further includes a rotary connecting rod fixing structure for fixing the second end of the rotary connecting rod 302 to the second position in the second state. In the above solution, by adopting the rotary connecting rod fixing structure, the rotary connecting rod 302 can be fixed when the powered exoskeleton is in the wheeled movement mode, so as to avoid motion interference caused by the rotation of the rotary connecting rod 302.

For example, in an embodiment of the present disclosure, the rotary connecting rod fixing structure can be realized by a bandage 400 on the foot bottom plate. The bandage 400 on the foot bottom plate can be used for fixing the foot in the walking mode while fixing the rotary connecting rod 302 in the wheeled movement mode so as to avoid the motion interference by forbid the rotation of the rotary connecting rod 302 toward the ground.

It should be further noted that, as illustrated in FIGS. 1 to 6, in an embodiment of the present disclosure, for example, two first locking mechanisms are disposed; the two rotary connecting rods 302 of the two first locking mechanisms can lock and fix the foot bottom plate driving wheel 200 from two different positions, such that the locking is more reliable.

In addition, in an embodiment of the present disclosure, as illustrated in FIGS. 1 to 6, for example, the second locking mechanism includes a locking fixing shaft 501 and a locking sleeve 502. The locking fixing shaft 501 is disposed above the foot bottom plate driving wheel 200; and the locking sleeve 502 is disposed on the foot bottom plate 100, and capable of being locked with or detached from the locking fixing shaft 501 when the second surface 102 of the foot bottom plate 100 faces upward.

For example, by adopting the above solution, when it is required to switch to the wheeled movement mode, the foot bottom plate 100 can be turned over till the second surface 102 faces upward after the first locking part 301 and the second locking part 303 are detached, and locking can be realized by engaging the locking sleeve 502 on the foot bottom plate 100 and the locking fixing shaft 501 above the foot bottom plate driving wheel 200; when it is required to switch to the walking mode, the locking sleeve 502 can be detached from the locking fixing shaft 501, such that the foot bottom plate 100 and the foot bottom plate driving wheel 200 can be detached.

In an embodiment of the present disclosure, as illustrated in FIG. 5, for example, the locking sleeve 502 includes a sleeve structure 5021 which is capable of being sleeved on the locking fixing shaft 501; an elastic bayonet 5022 is provided on a side of the sleeve structure; and an opening size of the elastic bayonet 5022 is smaller than an inner diameter size of the sleeve 5021.

By adopting the above solution, the locking fixing shaft 501 can be clamped in the sleeve structure of the locking sleeve 502 from the bayonet on the locking sleeve 502; and detaching is realized by detaching the sleeve structure from the bayonet on the locking sleeve 502.

It should be understood that in another embodiment of the present disclosure, the structure of the locking sleeve 502 can be realized by adopting multiple manners, which are not limited. For example, the locking sleeve 502 can be provided with a structure such as a fastener and the like which is matched with the locking fixing shaft 501 for locking or detaching.

In addition, in an embodiment of the present disclosure, for example, as illustrated in FIG. 6, the foot bottom plate driving wheel 200 includes a driving motor 201. The driving motor 201 includes a fixing shaft 2011, a motor rotor 2012 disposed on the fixing shaft 2011 and a wheel body 2013 disposed outside the motor rotor 2012 and is capable of rotating when driven by the motor rotor 2012.

In the above solution, the motor rotor 2012 can be driven by the driving motor 201 to rotate, and further the wheel body 2013 is driven by the motor rotor 2012 to rotate. Thus, the foot bottom plate driving wheel 200 can rotate.

It should be understood that in another embodiment of the present disclosure, a specific structure of the foot bottom plate driving wheel 200 can be many types, which are not limited herein.

In addition, in an embodiment of the present disclosure, for example, the wheel body 2013 is a rubber wheel. Of course, it should be understood that a material of the wheel body 2013 is not limited in actual application.

In addition, in an embodiment of the present disclosure, for example, as illustrated in FIGS. 4 and 6, two ends of the fixing shaft 2011 of the foot bottom plate driving wheel 200 are connected to two first connecting rods 601 respectively; a connecting shaft 602 is connected between the two first connecting rods 601; a connecting part is disposed below the leg part, and the connecting part is matched with the connecting shaft 602 to detachably connect the foot bottom plate driving wheel 200 below the leg part.

In an embodiment of the present disclosure, as illustrated in FIGS. 4 and 6, two second connecting rods 702 are further connected to two ends of the fixing shaft 2011 of the foot bottom plate driving wheel 200 respectively, and a locking fixing shaft 501 is connected between the two second connecting rods 702.

For example, in an embodiment of the present disclosure, as illustrated in FIGS. 1 to 6, the foot part further includes a foot bottom plate supporting wheel 700 which is disposed on the first surface 101 of the foot bottom plate 100 and is used for being matched with the foot bottom plate driving wheel. The foot bottom plate 100 is driven to perform wheeled movement through the match of the foot bottom plate supporting wheel 700 and the foot bottom plate driving wheel 200.

Figure 1:
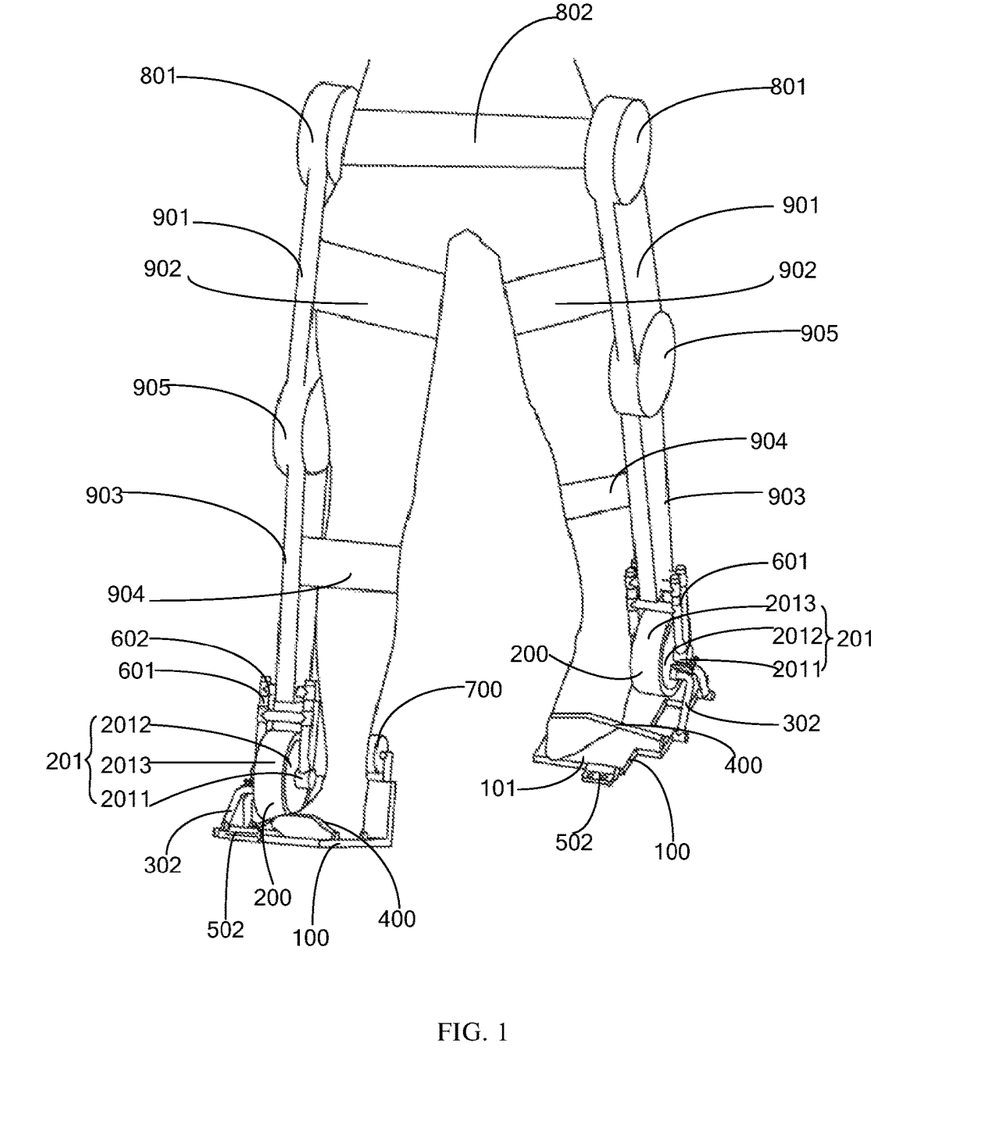
FIG. 1 is a structural schematic diagram of a powered exoskeleton in a walking mode provided by an embodiment of the present disclosure.
Figure 2:
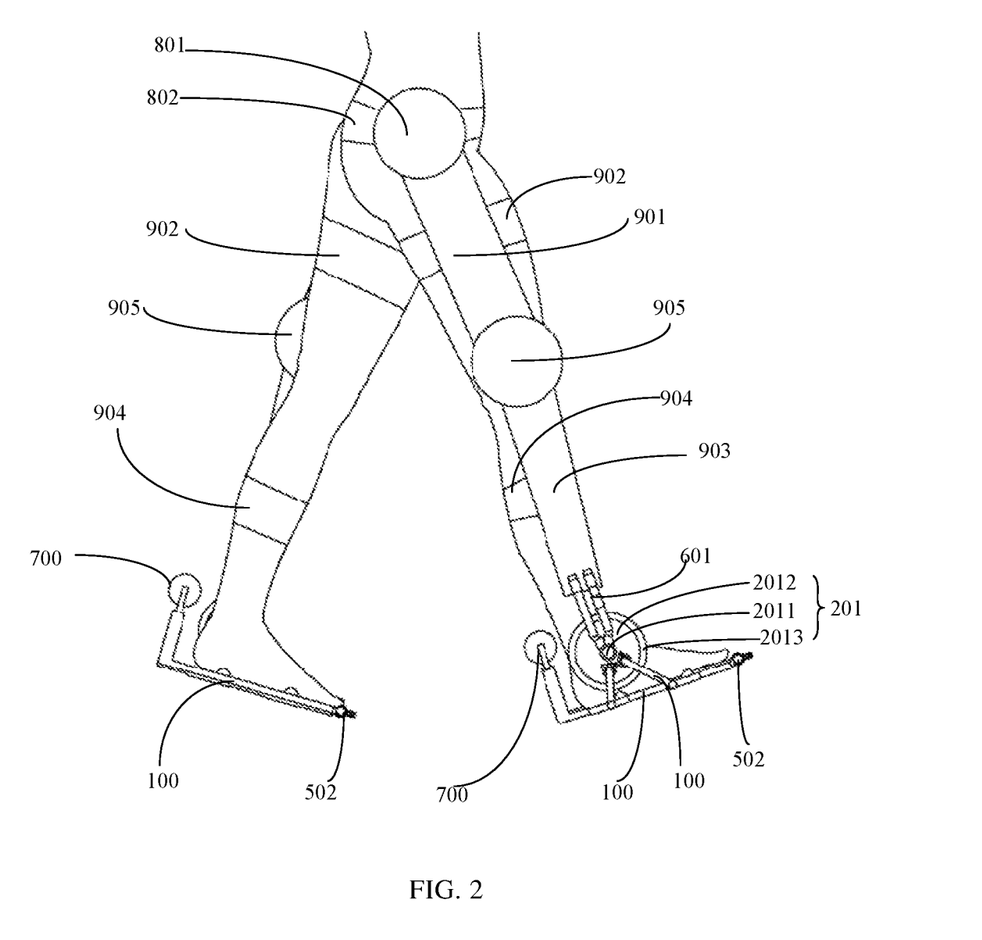
FIG. 2 is a structural schematic diagram from another angle of the powered exoskeleton in the walking mode provided by an embodiment of the present disclosure.
Figure 3:
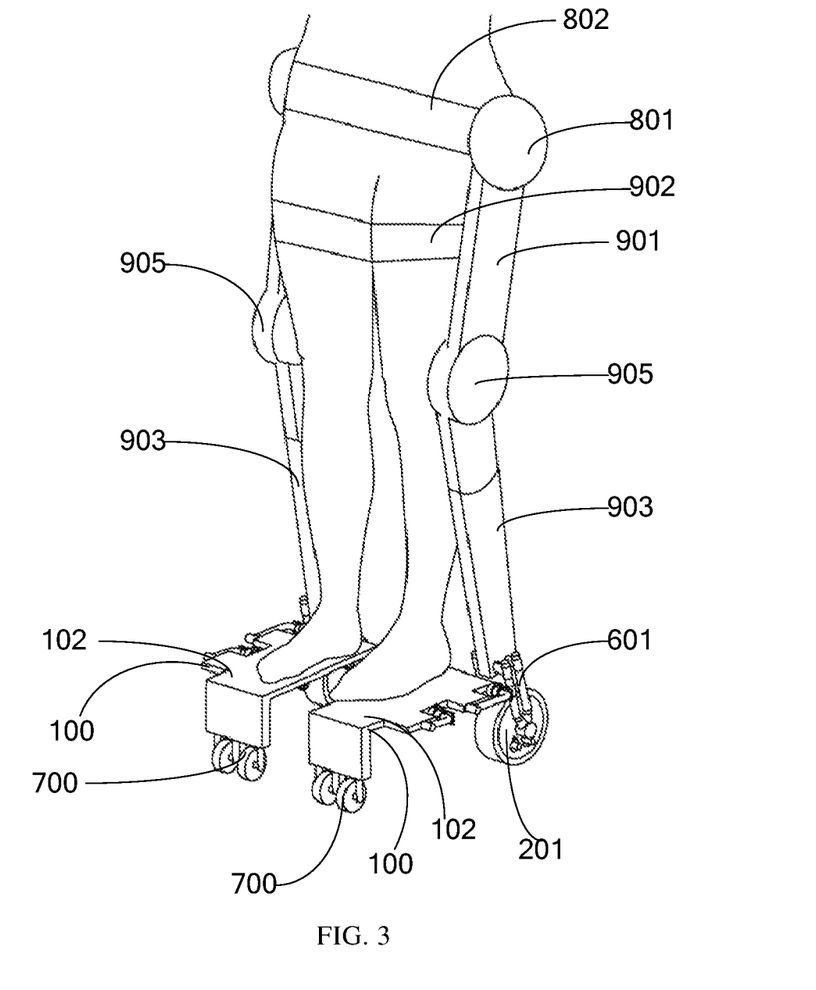
FIG. 3 is a structural schematic diagram of the powered exoskeleton in a wheeled movement mode provided by an embodiment of the present disclosure.

For example, in an embodiment of the present disclosure, as illustrated in FIGS. 1 to 3, the powered exoskeleton mainly includes an ilium part, leg parts and foot parts. The ilium part includes a hip joint motor 801 and a hip bandage 802; the foot part includes a thigh connecting part 901 for fixing and supporting a thigh of the human body, a thigh bandage 902 for fixing the thigh connecting part 901 with the thigh of the human body, a shank connecting part 903 for fixing and supporting a shank of the human body, a shank bandage 904 for fixing the shank connecting part 903 with the shank of the human body, and a knee joint driving part 905 connected between the thigh connecting part 901 and the shank connecting part 903.

For example, the keel joint driving part 905 can adopt a knee joint motor.

For example, FIG. 2 is a schematic diagram from an angle that the powered exoskeleton provided by an embodiment of the present disclosure drives the human body to walk. The hip bandage 802 is used to fixedly connect the hip joint motor 801 with the hip of the human body; the thigh bandage 902 is used to fixedly connect the thigh connecting part 901 of the exoskeleton with the thigh of the human body; and the shank bandage 904 is used to fixedly connect the shank connecting part 903 of the exoskeleton with the shank of the human body. When motors in respective parts of the powered exoskeleton simulate a joint rotating relationship of the human body in an actual process with a relationship of a rotary angle and time of the motor at each joint in a predetermined manner or following a real-time control signal, the aim that the exoskeleton drives the human body to walk is realized.

For example, in an embodiment of the present disclosure, the shank connecting part 903 is provided with a length-adjustable telescopic structure.

For example, by adopting the above solution, when the foot bottom plate 100 is switched between the walking mode and the wheeled movement mode, the foot bottom plate 100 will be turned over to be respectively located above or below the foot bottom plate driving wheel 200; in this way, a length between the shank and the foot bottom plate 100 is changed; and therefore, in an embodiment of the present disclosure, the thigh connecting part 901 and the shank connecting part 903 are designed to be provided with length-adjustable structures. Upon switching between the two modes or being used by different users, since lengths of the legs of different users are different and length ratios of the thighs and shanks are different, the exoskeleton can still be suitable for the user after the mode is switched or the user is replaced by adjusting the length of the thigh connecting part 901 and the length of the shank connecting part 903 and by regulating an angle between the shank connecting part 903 and the thigh connecting part 901 through the knee joint motor, such that the powered exoskeleton drives the human body to walk or move in a wheel type.

For example, in an embodiment of the present disclosure, length adjustment of the shank connecting part 903 can be realized by adopting a sleeve structure. For example, the shank connecting part 903 includes at least two shank connecting sleeves which are sleeved together. It should be understood that in another embodiment of the present disclosure, the shank connecting part 903 can realize length adjustment by adopting other structures. For example, the length of the shank connecting part 903 can be adjusted by using at least two sections of connecting rods which are in threaded connection.

The above is merely exemplary implementation modes of the embodiments of the present disclosure. It should be pointed out that those ordinarily skilled in the art can make a plurality of improvements and substitutions without departing from the technical principle of the present disclosure, and these improvements and substitutions are also deemed to be in a protection scope of the present disclosure.

The application claims priority of Chinese Patent Application No. 201610006157.4 filed on Jan. 5, 2016, the disclosure of which is incorporated herein by reference in its entirety as part of the present application.

The invention claimed is:

1. A powered exoskeleton, comprising:
   a leg part for being fixed on legs of a human body and capable of driving the legs of the human body to move; and
   a foot part for being fixed on feet of the human body and capable of driving the feet of the human body to move, wherein the foot part comprises:
      a foot bottom plate, comprising a first surface and a second surface opposite to each other; and
      a foot bottom plate driving wheel, connected below the leg part,
   the foot bottom plate is movably connected to the foot bottom plate driving wheel and capable of being turned over relative to the foot bottom plate driving wheel, such that the foot part has a first state and a second state,
   in the first state, the first surface of the foot bottom plate faces upward and is connected below the foot bottom plate driving wheel, such that the foot part is in a walking mode; and
   in the second state, the second surface of the foot bottom plate faces upward and is connected above the foot bottom plate driving wheel, such that the foot part is in a wheeled movement mode,
   wherein the foot bottom plate driving wheel comprises a driving motor, the driving motor comprises a fixing shaft, a motor rotor disposed on the fixing shaft and a wheel body disposed outside the motor rotor and capable of rotating upon being driven by the motor rotor,
   wherein two ends of the fixing shaft of the foot bottom plate driving wheel are connected to two first connecting rods, respectively, a connecting shaft is connected between the two first connecting rods, a connecting part is disposed below the leg part, and the connecting part is matched with the connecting shaft to detachably connect the foot bottom plate driving wheel below the leg part.

2. The powered exoskeleton according to claim 1, wherein the foot bottom plate is movably and detachably connected to the foot bottom plate driving wheel.

3. The powered exoskeleton according to claim 1, wherein the foot part further comprises:
   a first locking mechanism, configured to lock or detach the foot bottom plate driving wheel and the foot bottom plate, such that the foot bottom plate is connected below the foot bottom plate driving wheel in the first state; and
   a second locking mechanism, configured to lock or detach the foot bottom plate driving wheel and the foot bottom plate, such that the foot bottom plate is connected above the foot bottom plate driving wheel in the second state.

4. The powered exoskeleton according to claim 3, wherein the first locking mechanism comprises a first locking part, disposed on the foot bottom plate driving wheel;
   a rotary connecting rod, comprising a first end and a second end, the first end being rotatably connected to the foot bottom plate; and a second locking part, disposed on the second end of the rotary connecting rod and capable of being matched with the first locking part to lock or detach the foot bottom plate driving wheel with the foot bottom plate, in the first state, the second end of the rotary connecting rod rotates to a first position located above the first surface of the foot bottom plate, and the second locking part is matched with the first locking part to be locked;

in the second state, the second locking part is detached from the first locking part, and the second end of the rotary connecting rod rotates to a second position flush with the foot bottom plate.

5. The powered exoskeleton according to claim 4, wherein
the first locking part comprises:
a groove disposed in the foot bottom plate driving wheel; and
a fixing pillar disposed in the groove;
the second locking part comprises:
an inner ring which is capable of being sleeved outside the fixing pillar;
an outer ring which is capable of being accommodated in the groove, the outer ring being sleeved outside the inner ring, a gap being formed between the outer ring and the inner ring;
a rotatable locking pillar disposed in the gap, a width of the gap being changed when the locking pillar rotates to different angles; and
a control handle controlling the locking pillar to rotate, the control handle being connected to the locking pillar,
upon the locking pillar rotating to a first angle, the gap has a first width, the locking pillar abuts the inner ring against the fixing pillar, and the outer ring abuts against the inner wall of the groove;
upon the locking pillar rotating to a second angle, the gap has a second width, the second width is smaller than the first width, the inner ring is separated from the fixing pillar, and the outer ring is separated from the inner wall of the groove.

6. The powered exoskeleton according to claim 4, wherein the foot part further comprises a rotary connecting rod fixing structure for fixing the second end of the rotary connecting rod to the second position in the second state.

7. The powered exoskeleton according to claim 3, wherein the second locking mechanism comprises:
a locking fixing shaft, disposed above the foot bottom plate driving wheel; and
a locking sleeve, which is disposed on the foot bottom plate and capable of being locked with or detached from the locking fixing shaft upon the second surface of the foot bottom plate facing upward.

8. The powered exoskeleton according to claim 7, wherein the locking sleeve comprises: a sleeve structure which is capable of being sleeved on the locking fixing shaft, an elastic bayonet is provided on a side of the sleeve structure, and an opening size of the elastic bayonet is smaller than an inner diameter size of the sleeve.

9. The powered exoskeleton according to claim 1, wherein the wheel body is a rubber wheel.

10. The powered exoskeleton according to claim 1, wherein the foot part further comprises a foot bottom plate supporting wheel, the foot bottom plate supporting wheel is disposed on the first surface of the foot bottom plate and is configured for being matched with the foot bottom plate driving wheel.

11. The powered exoskeleton according to claim 1, wherein the leg part comprises:
a thigh connecting part for fixing and supporting a thigh of the human body;
a shank connecting part for fixing and supporting a shank of the human body; and
a knee joint driving part connected between the thigh connecting part and the shank connecting part.

12. The powered exoskeleton according to claim 11, wherein the thigh connecting part and/or the shank connecting part comprises a length-adjustable structure.

13. The powered exoskeleton according to claim 2, wherein the foot part further comprises:
a first locking mechanism, configured to lock or detach the foot bottom plate driving wheel and the foot bottom plate, such that the foot bottom plate is connected below the foot bottom plate driving wheel in the first state; and
a second locking mechanism, configured to lock or detach the foot bottom plate driving wheel and the foot bottom plate, such that the foot bottom plate is connected above the foot bottom plate driving wheel in the second state.

14. The powered exoskeleton according to claim 13, wherein the first locking mechanism comprises a first locking part, disposed on the foot bottom plate driving wheel;
a rotary connecting rod, comprising a first end and a second end, the first end being rotatably connected to the foot bottom plate; and
a second locking part, disposed on the second end of the rotary connecting rod and capable of being matched with the first locking part to lock or detach the foot bottom plate driving wheel with the foot bottom plate,
in the first state, the second end of the rotary connecting rod rotates to a first position located above the first surface of the foot bottom plate, and the second locking part is matched with the first locking part to be locked;
in the second state, the second locking part is detached from the first locking part, and the second end of the rotary connecting rod rotates to a second position flush with the foot bottom plate.

15. The powered exoskeleton according to claim 14, wherein
the first locking part comprises:
a groove disposed in the foot bottom plate driving wheel; and
a fixing pillar disposed in the groove;
the second locking part comprises:
an inner ring which is capable of being sleeved outside the fixing pillar;
an outer ring which is capable of being accommodated in the groove, the outer ring being sleeved outside the inner ring, a gap being formed between the outer ring and the inner ring;
a rotatable locking pillar disposed in the gap, a width of the gap being changed when the locking pillar rotates to different angles; and
a control handle controlling the locking pillar to rotate, the control handle being connected to the locking pillar,
upon the locking pillar rotating to a first angle, the gap has a first width, the locking pillar abuts the inner ring against the fixing pillar, and the outer ring abuts against the inner wall of the groove;
upon the locking pillar rotating to a second angle, the gap has a second width, the second width is smaller than the first width, the inner ring is separated from the fixing pillar, and the outer ring is separated from the inner wall of the groove.

16. The powered exoskeleton according to claim 14, wherein the foot part further comprises a rotary connecting rod fixing structure for fixing the second end of the rotary connecting rod to the second position in the second state.

17. The powered exoskeleton according to claim 2, wherein the foot bottom plate driving wheel comprises a driving motor, the driving motor comprises a fixing shaft, a motor rotor disposed on the fixing shaft and a wheel body disposed outside the motor rotor and capable of rotating upon being driven by the motor rotor.

18. The powered exoskeleton according to claim 2, wherein the foot part further comprises a foot bottom plate supporting wheel, the foot bottom plate supporting wheel is disposed on the first surface of the foot bottom plate and is configured for being matched with the foot bottom plate driving wheel.

* * * * *